(12) United States Patent
Atarashi et al.

(10) Patent No.: US 7,527,409 B2
(45) Date of Patent: May 5, 2009

(54) DISPLAY UNIT

(75) Inventors: Takayuki Atarashi, Tsuchiura (JP); Shuichi Terakado, Mito (JP); Hiroshi Akai, Fujisawa (JP); Naoki Yotsumoto, Ome (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/525,833

(22) Filed: Sep. 25, 2006

(65) Prior Publication Data

US 2007/0076431 A1 Apr. 5, 2007

(30) Foreign Application Priority Data

Oct. 3, 2005 (JP) .............. 2005-289504

(51) Int. Cl.
*F21V 7/04* (2006.01)
(52) U.S. Cl. .............. 362/613; 362/608; 362/612; 362/632; 362/294; 362/373; 362/600
(58) Field of Classification Search .......... 362/613, 362/600, 373, 612, 608, 632, 294, 580, 547, 362/126, 218, 264, 345; 349/161, 69
See application file for complete search history.

(56) References Cited

U.S. PATENT DOCUMENTS

| | | | |
|---|---|---|---|
| 6,960,001 B2 * | 11/2005 | Nitto et al. ................ | 362/218 |
| 7,309,146 B2 * | 12/2007 | Hayashi et al. ............. | 362/294 |
| 2006/0017404 A1 * | 1/2006 | Jang ........................... | 315/291 |
| 2007/0008275 A1 * | 1/2007 | Sugitani et al. ............ | 345/102 |
| 2007/0019419 A1 * | 1/2007 | Hafuka et al. .............. | 362/373 |

FOREIGN PATENT DOCUMENTS

JP 2005-038771 2/2005

* cited by examiner

*Primary Examiner*—Sandra L O'Shea
*Assistant Examiner*—Jessica L McMillan
(74) *Attorney, Agent, or Firm*—Antonelli, Terry, Stout & Kraus, LLP.

(57) ABSTRACT

An edge light display unit includes light generating sources, a substrate mounting the light generating sources, a lens, a diffusion plate expanding light input in a side surface of the diffusion plate as to irradiate a front surface of the diffusion plate, and a heat sink thermally contacted with the substrate. A base portion of the heat sink has a substrate mounting surface and a fin constituting surface substantially perpendicular to the substrate mounting surface. At least one fin extends from the fin constituting surface in a direction substantially perpendicular thereto and along the plurality of light generating sources in a direction parallel to substrate. An air supply and exhaust surface of a cooling air are formed in a back surface side of the display unit.

20 Claims, 5 Drawing Sheets

DISPLAY UNIT

BACKGROUND OF THE INVENTION

1. Field of the Invention

The present invention relates to a liquid crystal panel type display unit using a light generating source such as an LED or the like as an edge light type backlight.

2. Description of Related Art

As a prior art of an edge light type backlight system using an LED or the like as a light generating source, for example, there is patent document 1 (JP-A-2005-38771).

Figure 6:
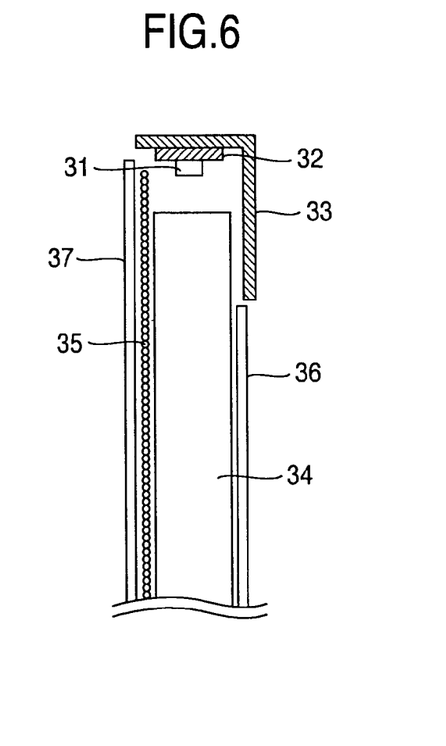
FIG. 6 is a cross sectional view of a conventional display unit.

FIG. 6 is a view citing a drawing in the patent document 1.

In FIG. 6, the display unit is provided with a plurality of LEDs 31 corresponding to a light source, and an LED substrate 32 mounting the LEDs 31 thereon. The display unit is provided with a diffusion plate 34 irradiating the light of the light source emitted from an incident surface in a side surface as a surface light source from an irradiation surface in a front surface, and a display board case 37 accommodating the LEDs 31, the LED substrate 32 and the diffusion plate, and at least a part of the LED substrate 32 is closely attached to an inner surface of the display board case 37. Further, the LEDs 31 are arranged in such a manner as to face to the incident surface in the side surface of the diffusion plate 34.

BRIEF SUMMARY OF THE INVENTION

In the case that the LED is used as a light source for a backlight such as a display unit or the like, if a lot of current is circulated for securing a brightness, a lot of heat is generated in view of a characteristic of the LED, so that the LED comes to a high temperature.

In the conventional display unit, since a heat radiation of the LED is not sufficient, the LED comes to a high temperature, so that there is a problem that the characteristic of the LED itself is deteriorated such as a light output is lowered, a long-term service life can not secured, or the like. Accordingly, it is necessary to descend the current value for suppressing the heat generation in order to maintain the characteristic of the LED itself, and it is impossible to obtain a sufficient light intensity as the backlight of the display unit. Further, if the number of the LEDs is increased for obtaining the light intensity, not only a calorific power of the LED is increased, but also there is a problem that a cost is increased at that degree.

Further, in the case that a temperature difference exists between a plurality of LEDs, the temperature difference causes a light output irregularity of the LED, and there is a problem that it appears as a brightness irregularity of a screen of the display unit.

An object of the present invention is to provide an LED backlight type display unit which efficiently radiates heat generated by a light generating source such as the LED or the like, is bright without deteriorating a performance of the LED and has a reduced brightness irregularity.

Means for Solving the Problem

In order to achieve the object mentioned above, in accordance with the present invention, there is provided an edge light type display unit comprising:

a plurality of light generating sources;

a substrate on which the light generating sources are mounted;

a lens directing light beams from the light generating sources in one direction;

a diffusion plate expanding the light beams input from an incident surface in a side surface and outgoing from the lens to a surface shape so as to irradiate to a front surface; and a liquid crystal panel attached to a front surface of the diffusion plate, wherein the display unit is provided with a heat sink attached so as to be thermally contacted with an opposite side to the light generating source mounting surface of the substrate, and one or a plurality of fans, a base portion of the heat sink has a substrate mounting surface and a fin constituting surface, the fin constituting surface is approximately perpendicular to the substrate mounting surface, and the fin constituting surface of the base portion and an air supply and exhaust surface of a cooling air are formed in an opposite side to a screen display side of the display.

Further, in order to achieve the object mentioned above, in accordance with the present invention, there is provided an edge light type display unit comprising:

a plurality of light generating sources;

a substrate on which the light generating sources are mounted;

a lens directing light beams from the light generating sources in one direction;

a diffusion plate expanding the light beams input from an incident surface in a side surface and outgoing from the lens to a surface shape so as to irradiate to a front surface; and a liquid crystal panel attached to a front surface of the diffusion plate, wherein the display unit is provided with a heat sink attached so as to be thermally contacted with an opposite side to the light generating source mounting surface of the substrate, and one or a plurality of fans, a base portion of the heat sink has an approximately L-shaped form, a base surface on which the substrate is mounted, and a base surface in which the fin is constituted are approximately perpendicular to each other, and the base surface in which the fin of the base portion is constituted, and an air supply and exhaust surface of a cooling air are formed in an opposite side to a screen display side of the display.

Further, in order to achieve the object mentioned above, in accordance with the present invention, there is provided an edge light type display unit comprising:

a plurality of light generating sources;

a substrate on which the light generating sources are mounted;

a lens directing light beams from the light generating sources in one direction;

a diffusion plate expanding the light beams input from an incident surface in a side surface and outgoing from the lens to a surface shape so as to irradiate to a front surface; and a liquid crystal panel attached to a front surface of the diffusion plate, wherein the display unit is provided with a heat sink attached so as to be thermally contacted with an opposite side to the light generating source mounting surface of the substrate, and two fans attached to both end portions of the heat sink in such a manner that a cooling air circulates in an exhausting direction, and a wind leak preventing cover is provided in an end surface portion of the heat sink in such a manner that an inflow port of the cooling air to the heat sink is formed near a center portion of the heat sink.

Further, in order to achieve the object mentioned above, in accordance with the present invention, there is provided an edge light type display unit comprising:

a plurality of light generating sources;

a substrate on which the light generating sources are mounted;

a lens directing light beams from the light generating sources in one direction;

a diffusion plate expanding the light beams input from an incident surface in a side surface and outgoing from the lens to a surface shape so as to irradiate to a front surface; and a liquid crystal panel attached to a front surface of the diffusion plate, wherein the display unit is provided with a heat sink attached so as to be thermally contacted with an opposite side to the light generating source mounting surface of the substrate, and one or a plurality of fans attached to a portion near a center portion of the heat sink in such a manner that a cooling air circulates in a compressing direction, and a wind leak preventing cover is provided in an end surface portion of the heat sink in such a manner that a discharge port of the cooling air from the heat sink is formed near both end portions of the heat sink.

Further, in order to achieve the object mentioned above, in accordance with the present invention, there is provided an edge light type display unit comprising:

a plurality of light generating sources;

a substrate on which the light generating sources are mounted;

a lens directing light beams from the light generating sources in one direction;

a diffusion plate expanding the light beams input from an incident surface in a side surface and outgoing from the lens to a surface shape so as to irradiate to a front surface; and a liquid crystal panel attached to a front surface of the diffusion plate, wherein the display unit is provided with a heat sink attached so as to be thermally contacted with an opposite side to the light generating source mounting surface of the substrate, and one or a plurality of fans, a base portion of the heat sink has an approximately L-shaped form, a base surface on which the substrate is mounted, and a base surface in which the fin is constituted are approximately perpendicular to each other, the base surface in which the fin of the base portion is constituted, and an air supply and exhaust surface of a cooling air are formed in an opposite side to a screen display side of the display, and a plurality of fins constituted in the base portion are formed by plate fins arranged approximately in parallel to the base surface on which the substrate is mounted.

Further, in order to achieve the object mentioned above, in accordance with the present invention, there is provided an edge light type display unit comprising:

a plurality of light generating sources;

a substrate on which the light generating sources are mounted;

a lens directing light beams from the light generating sources in one direction;

a diffusion plate expanding the light beams input from an incident surface in a side surface and outgoing from the lens to a surface shape so as to irradiate to a front surface; and a liquid crystal panel attached to a front surface of the diffusion plate, wherein the display unit is provided with a heat sink attached so as to be thermally contacted with an opposite side to the light generating source mounting surface of the substrate, and one or a plurality of fans, a base portion of the heat sink has an approximately L-shaped form, a base surface on which the substrate is mounted, and a base surface in which the fin is constituted are approximately perpendicular to each other, the base surface in which the fin of the base portion is constituted, and an air supply and exhaust surface of a cooling air are formed in an opposite side to a screen display side of the display, and a plurality of fins constituted in the base portion are formed by pin-type fins arranged approximately in parallel to the base surface on which the substrate is mounted.

Further, in order to achieve the object mentioned above, in accordance with the present invention, there is provided an edge light type display unit comprising:

a plurality of light generating sources;

a substrate on which the light generating sources are mounted;

a lens directing light beams from the light generating sources in one direction;

a diffusion plate expanding the light beams input from an incident surface in a side surface and outgoing from the lens to a surface shape so as to irradiate to a front surface; and a liquid crystal panel attached to a front surface of the diffusion plate, wherein the display unit is provided with a heat sink attached so as to be thermally contacted with an opposite side to the light generating source mounting surface of the substrate, and two rotating speed variable type fans attached to both end portions of the heat sink in such a manner that a cooling air circulates in an exhausting direction, a wind leak preventing cover is provided in an end surface portion of the heat sink in such a manner that an inflow port of the cooling air to the heat sink is formed near a center portion of the heat sink, a temperature sensor is provided in the light generating source or the substrate on which the light generating source is mounted, so as to be capable of monitoring a temperature thereof, and the rotating speed of the fan is controllable in such a manner that the temperature of the light generating source becomes proper at an abnormal time.

In accordance with the present invention, there can be provided an LED backlight type display unit which efficiently radiate heat generated in a light generating source such as an LED or the like, is bright without deteriorating a performance of the LED and has a reduced brightness irregularity.

Other objects, features and advantages of the invention will become apparent from the following description of the embodiments of the invention taken in conjunction with the accompanying drawings.

DETAILED DESCRIPTION OF THE INVENTION

A description will be given below of a first embodiment with reference to FIGS. 1, 2, 3 and 4.

In recent years, the LED has an increased luminous efficiency, attracts attention as a backlight light source for a liquid crystal display having an improved color reproduction performance and is developed in many fields such as a field for a display of a personal computer, a filed for a liquid crystal television set and the like. However, at this time, the luminous efficiency is lower in comparison with a fluorescent cold cathode tube system corresponding to the present major backlight system, and a great current is necessary for obtaining the same brightness. Accordingly, there is a problem that a heat loss, that is, a calorific power in the LED becomes great.

The present invention achieves a structure for efficiently radiating the heat generated in the LED to the ambient air.

Figure 1:
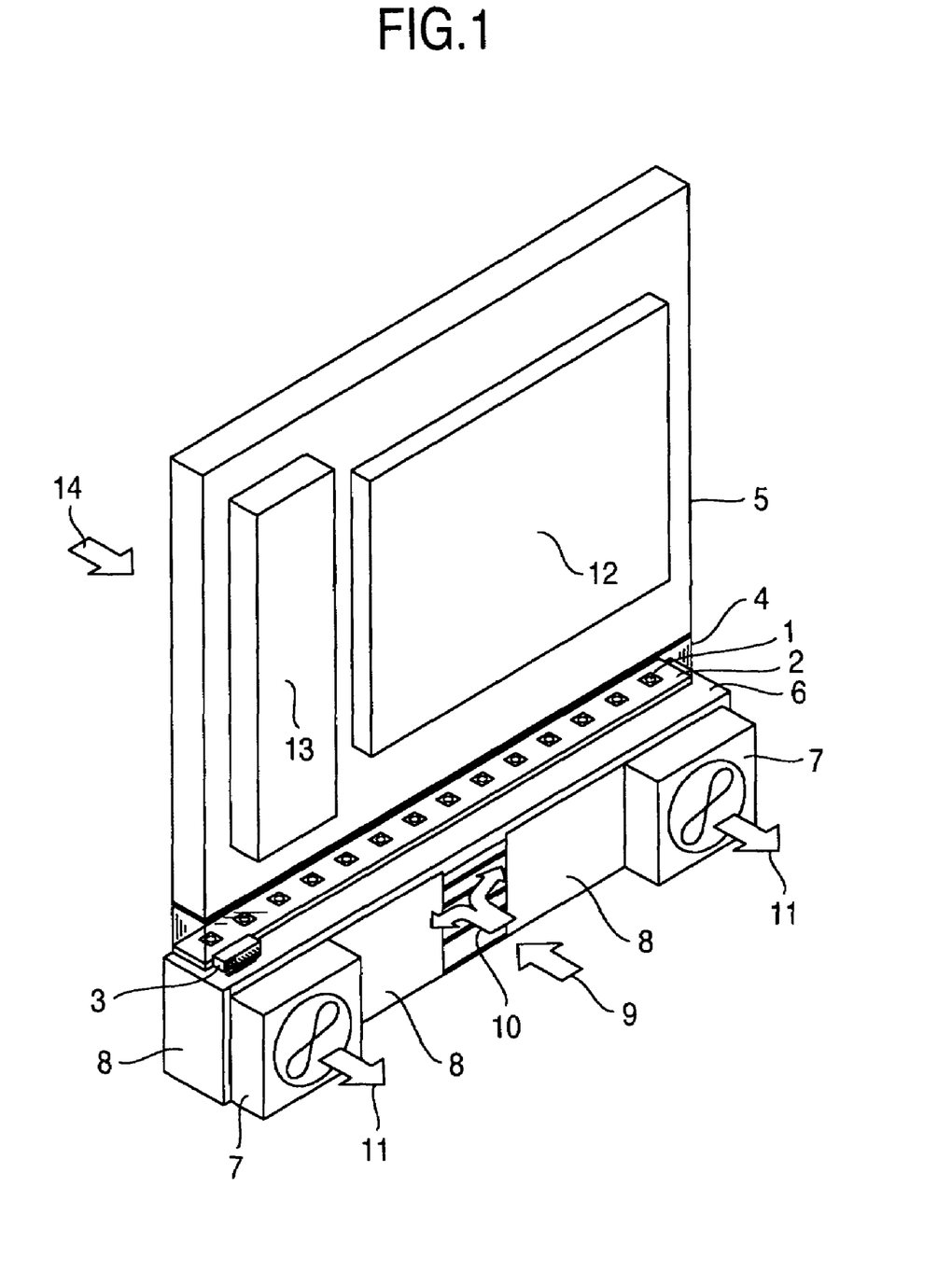
FIG. 1 is an internal perspective view of a display unit provided with a first embodiment in accordance with the present invention as seen from a back side.

FIG. 1 is an internal perspective view of a display unit provided with a first embodiment in accordance with the present invention as seen from a back side.

In FIG. 1, a lot of LEDs 1 corresponding to a light generating source are mounted on a substrate 2 in a single horizontal row. In this case, the LED 1 may be constituted by a white monochromatic LED, or an LED achieving a white color by mixing individual R, G and B LEDs. In this case, in order to improve a color reproduction performance of a display, it is advantageous to mix three color LEDs capable of adjusting light generation amounts of R, G and B individually. The LEDs 1 are installed via a sub mount or are directly mounted on the substrate 2. As an aspect of mounting the LEDs 1, there are listed up a soldering process, an adhering process, a solder ball bonding process and the like for well transmitting the heat of the LEDs to the substrate 2. As a material of the substrate 2, there are listed up a paper phenol substrate, a glass epoxy substrate, a metal substrate such as an aluminum, a copper or the like, a ceramic substrate and the like. In order to prevent a high temperature caused by the heat generation of the LEDs 1, it is desirable to employ the metal substrate such as the aluminum, the copper or the like, the ceramic substrate and the like which have a good thermal conductivity.

A wiring for supplying an electric signal and an electric current is connected between the LED 1 and the substrate 2, in addition to the thermal and mechanical joint as mentioned above. A control circuit and a connector 3 for connecting the power source and the substrate 2 are mounted on the substrate 2.

A lens 4 directing the light beam from the LED 1 to one direction is mounted on an upper portion of the LED 1 and the substrate 2. The light beam from the lens 4 enters from an incident surface in a side surface of a liquid crystal panel 5 having a diffusion plate built-in, and is expanded in a surface shape so as to be irradiated to a front surface. It is desirable that a material of the lens 4 and the diffusion plate is constituted by a transparent resin such as an acrylic, a polycarbonate and the like. In an inner portion of a liquid crystal panel 5, a liquid crystal plate is attached to a front face of the diffusion plate, thereby structuring an edge light backlight type liquid crystal display unit. A reflection film for making the light beam outgo in one direction is coated on the other surface than an outgoing surface of the lens 4, or a reflection plate is attached thereto. Various optical patterns are formed in the diffusion plate for uniformly irradiating the incoming light beam forward within the surface. Further, a control substrate 12 and a power source 13 are attached to a back surface of the liquid crystal panel 5. A screen of the display unit in accordance with the present embodiment is structured such as to be observed from a direction of an arrow 14.

As mentioned above, the structure is made such that the light beam from the LED 1 goes out to the upper side, and the heat of the LED 1 is radiated to the lower side via the substrate 2. Specifically, a heat sink 6 is attached so as to be thermally contacted with the substrate 2, and fans 7 for ventilating a cooling air into the heat sink 6 are attached to both end portions of the heat sink 6 one by one. Further, a wind leak preventing cover 8 is attached to a side surface of the heat sink 6 except an air inflow port in a center portion and fan attached portion in both ends.

In accordance with the present embodiment, both of the fans 7 are attached in a direction of sucking out the air from the heat sink 6. The cooling air flows in as shown by an arrow 9 from an inflow port provided in the center portion of the heat sink 6, is branched into two directions as shown by an arrow 10, circulates within the heat sink so as to absorb the heat, and is discharged to an outer portion as shown by an arrow 11 from two fans 7 in both end portions. Since the wind leak preventing cover 8 is attached to both side surfaces of the heat sink 6, the inflow of the cooling air to the heat sink 6 is concentrated to the inflow port in the center portion.

Further, since the ventilation structure is made such that the cooling air flows in from the portion near the center portion of the heat sink 6, and is branched into right and left so as to cool the heat sink 6, it is possible to cool the LED 1 in the center portion in which the temperature tends to become higher, by a fresh air having a low temperature, and the cooling air flows uniformly right and left. Accordingly, it is possible to uniformly cool the temperature of the LED 1. Further, it is possible to achieve a stable cooling with a high performance by the heat sink 6 with the large-sized fans 7, and it is possible to stably prevent the temperature increase of the LED.

Figure 2:
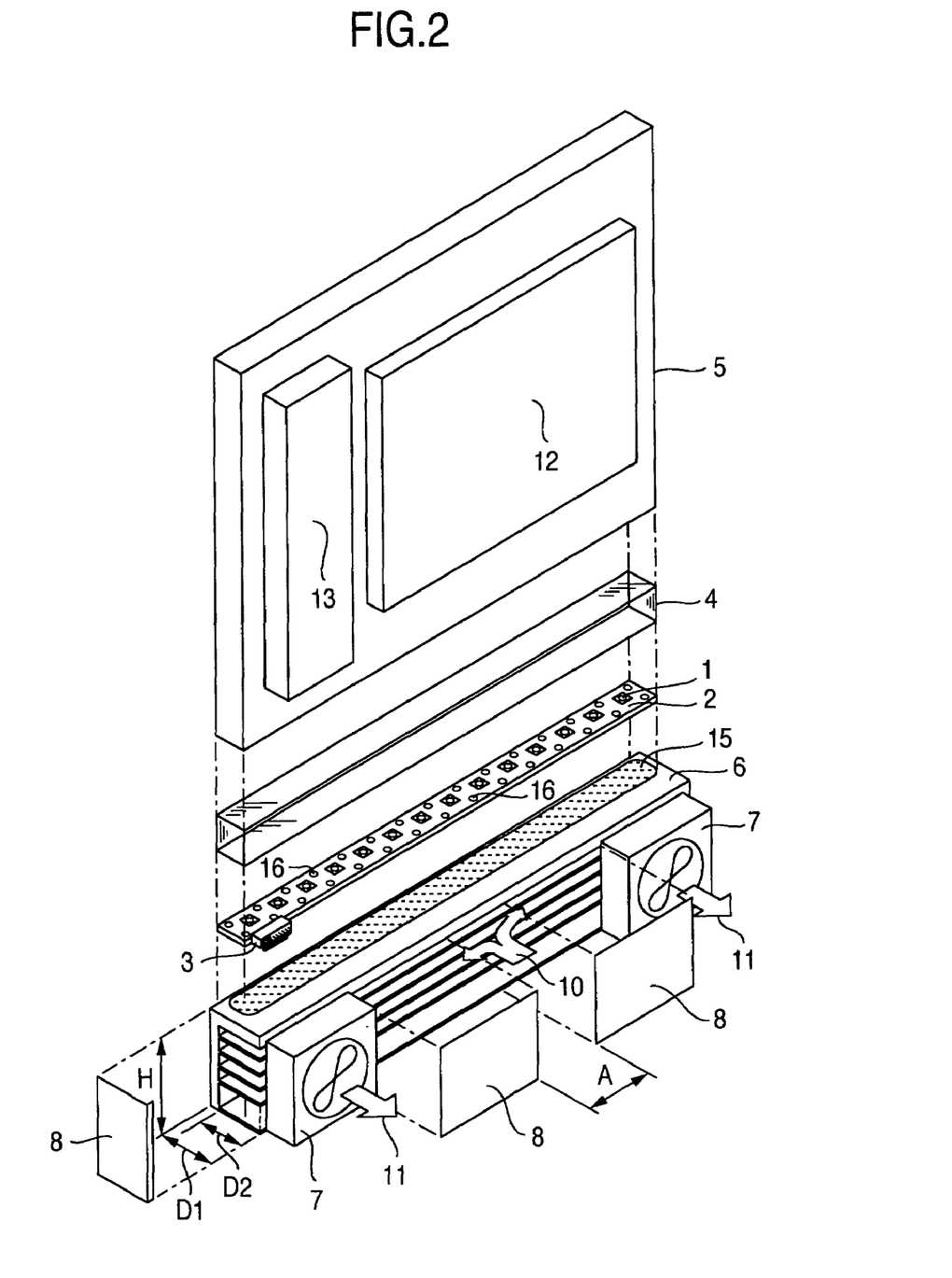
FIG. 2 is an internal exploded perspective view of the display unit provided with the first embodiment in accordance with the present invention as seen from a back side.

FIG. 2 is an internal exploded perspective view of the display unit provided with the first embodiment in accordance with the present invention as seen from the back side.

In this case, since the same reference numerals as those in FIG. 1 denote the same elements, a description thereof will be omitted.

In FIG. 2, the substrate 2 on which the LED 1 is mounted is attached to the heat sink 6 via a thermal conduction grease 15 so as to be thermally well contacted, as shown in the present drawing. It is desirable that the thermal conduction grease 15 is applied over an entire surface of a back surface of the substrate 2, and it is preferable that it is applied with no void. A lot of mounting holes 16 are provided in the substrate 2, and the substrate 2 is attached to the heat sink 6 by inserting screws or the like to the holes 16. Further, the substrate may be attached to the heat sink 6 by using a thermal conduction sheet or an adhesive agent in place of the thermal conduction grease 15.

It is preferable to set a width A of an inflow port for the cooling air constituted by the wind leak preventing cover 8 to about twice a fin height D2 of the heat sink 6. However, if it is not about twice, the effect of the present invention is not lost.

Figure 3:
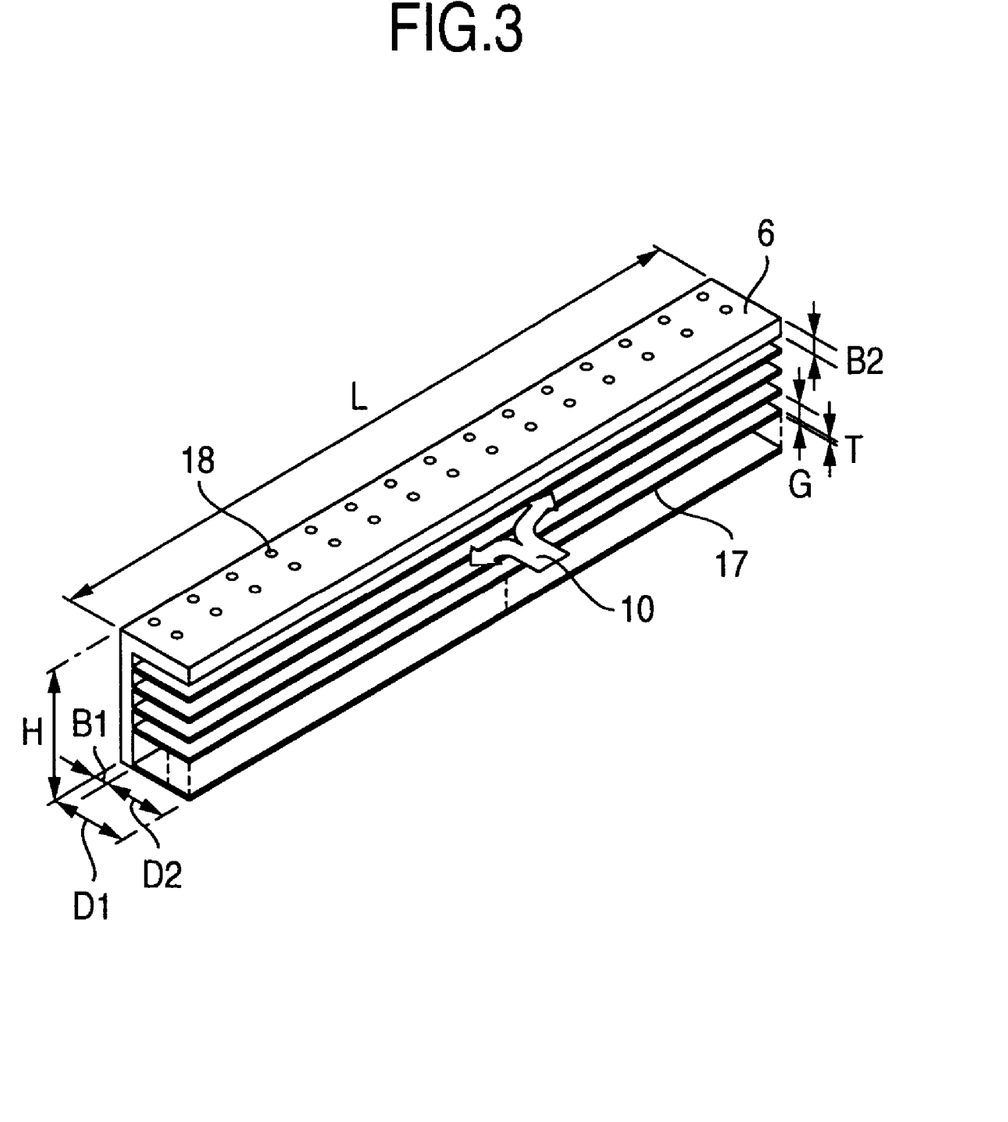
FIG. 3 is a perspective view of a heat sink used in the display unit provided with the first embodiment in accordance with the present invention.

FIG. 3 is a perspective view of the heat sink 6 used in the display unit provided with the first embodiment in accordance with the present invention.

In FIG. 3, a base portion of the heat sink 6 has an approximately L-shaped form, and a hole 18 to which the screw is attached is formed on a base surface on which the substrate is mounted. The base portion is extended in an L-shaped form from a front face side of the base surface on which the substrate is mounted to a lower side, and a lot of fins 17 are provided in a rear surface side of the extended base portion, the fins 17 being formed in a flat plate shape in the present embodiment.

As mentioned above, the base surface on which the substrate is mounted, and the base surface in which the flat plate fins 17 are constituted are approximately perpendicular. Further, the base surface in which the flat plate fins 17 are constituted, and the air supply and discharge surface of the cooling air to the heat sink 6 are formed in an opposite side to the screen display side of the display. Further, a plurality of flat plate fins 17 constituted in the base portion are arranged approximately in parallel to the base surface on which the substrate is mounted.

A material of the heat sink 6 is preferably constituted by a material having a good thermal conductivity, and is desirably constituted, for example, an aluminum, a copper or an alloy thereof.

In this case, thicknesses B1 and B2 of the heat sink base portion are preferably set to 3 to 5 mm in the case of the aluminum, and are preferably set to 2 to 3 mm in the case of the copper. A thickness T of the flat plate fin 17 is preferably set to about 1 mm in the case of the aluminum, and is preferably set to about 0.5 mm in the case of the copper. A gap G between the flat plate fins 17 is preferably set to about 2 to 5 mm.

Figure 4:
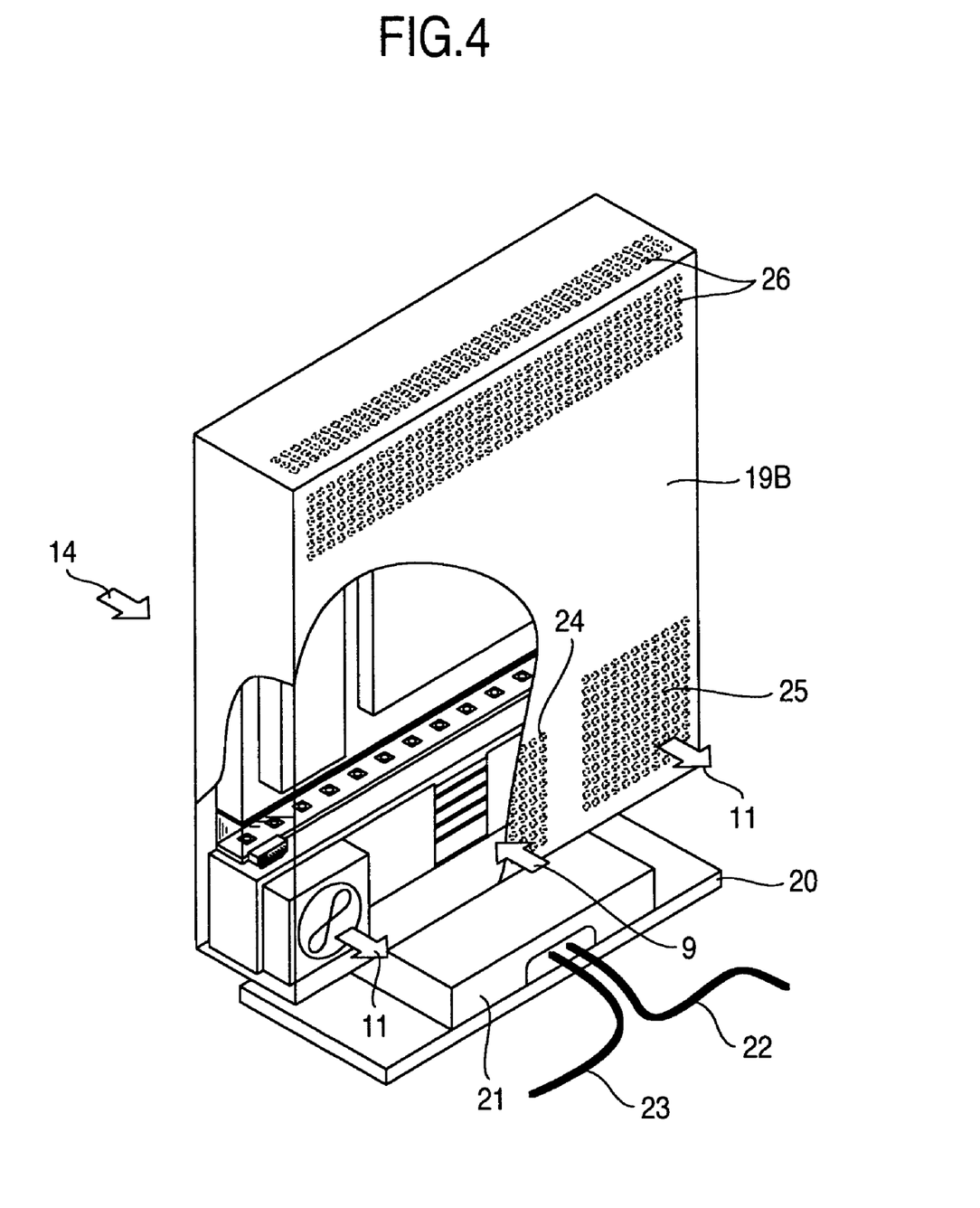
FIG. 4 is a perspective view of the display unit provided with the first embodiment in accordance with the present invention as seen from a back side.

FIG. 4 is a perspective view of the display unit provided with the first embodiment in accordance with the present invention as seen from the back side.

The display parts shown in FIG. 1 are accommodated within a display case 19B. The display parts and the display case 19B are fixed to a stand 20 so as to be erected. An electric power is supplied to the display by a power source cable 22 drawn out to an external portion while passing through a cable cover 21 coated on the stand 20. Further, in the case that the display in accordance with the present invention is constituted by a display for a personal computer, an image signal is received from the personal computer by a signal cable 23.

The display case 19B is provided with a ventilation portion 24 by which the air can be circulated by a porous portion, a grill portion, a mesh portion or the like, at a position aligned with the cooling air inflow port of the heat sink 6 shown in FIG. 3. Further, a similar ventilation portion 25 is provided for discharging the exhaust air from the fan 7 shown in FIG. 1 to the external portion of the display case 19B. Further, an upper portion of the display case 19B is provided with a ventilation portion 26 for discharging the heat of the other elements than the LED, for example, the control substrate 12 and the power source 13 shown in FIG. 1 to the external portion.

In accordance with the structure mentioned above, the heat generated in the LED 1 is thermally transferred to the substrate, 2, the thermal conduction grease 15, the heat sink 6 and the cooling air in this order, and is finally discharged to the external portion of the display unit.

In this case, since the inflow portion and the discharge portion of the cooling air exist in the back face of the display, it is hard that the discharge wind and the discharge heat affect a user of the personal computer even in the case that the display unit is used as the display for the personal computer. Further, it is hard that a noise generated from the fan comes down to ears of the user.

Further, in accordance with the structure mentioned above, since it is possible to efficiency radiate the heat generated in the LED or the like, as the edge light backlight type display unit using the light generating source such as the LED or the like, it is possible to achieve a backlight apparatus having a high brightness and a high color reproduction performance, or a display unit using the same. Further, since the backlight apparatus can be achieve by a reduced number of LEDs, it is possible to achieve a backlight apparatus having a low cost, or a display unit using the same. Further, since it is possible to uniformize the temperature difference between a plurality of LEDs, it is possible to reduce an irregularity of the LED light output, and it is possible to achieve a display unit having a reduced brightness irregularity of the screen of the display unit.

The description is given of the embodiment in which the fans 7 are provided in both end portions of the heat sink 6 one by one, however, the fans may be attached near the center portion of the heat sink 6 in such a manner that the cooling air is circulated in a compressing direction. At this time, the number of the fan may be set to one or plural number. In accordance with the structure mentioned above, the cooling air compressed to the center portion of the heat sink 6 by the fans 7 is circulated so as to be branched into right and left in the heat sink, and is discharged to the external portion through the discharge ports provided near both end portions of the heat sink 6. In accordance with the structure mentioned above, it is possible to cool by one fan, and there is an advantage of cost reduction.

Further, it is preferable that the fan 7 described in FIG. 1 or 3 is constituted by a rotating speed variable type fan, the LED 1 or the substrate 2 is provided with a temperature sensor capable of monitoring the temperature thereof, and the rotating speed of the fan can be increased in such a manner that the temperature of the LED 1 becomes proper, at an abnormal time such as one fan stops or the like. In accordance with the structure mentioned above, it is possible to keep the temperature of the LED equal to or less than a prescribed temperature even if the fan breaks down, and it is possible to achieve a display unit having high redundancy and reliability.

A description will be given below of a second embodiment with reference to FIG. 5.

Figure 5:
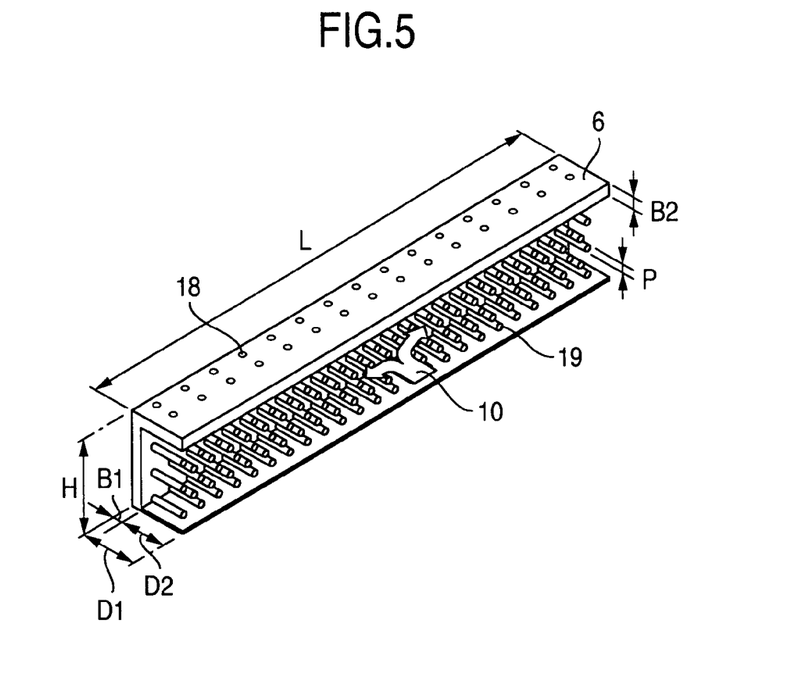
FIG. 5 is a perspective view of a heat sink used in a display unit provided with a second embodiment in accordance with the present invention.

FIG. 5 is a perspective view of a heat sink used in a display unit provided with the second embodiment in accordance with the present invention.

In FIG. 5, in the present embodiment, the other structures than the heat sink 6 are the same as those of the first embodiment in accordance with the present invention, and a difference within the heat sink 6 exists in a structure in which a plurality of fins formed in the base portion are constituted by pin-type fins 19. In the same manner as the first embodiment, the material of the heat sink 6 is preferably constituted by the aluminum or the copper, and it is preferable that a pin diameter P of the pin fin 19 is set to 0.5 to 1.0 mm. Further, in the same manner as the first embodiment, the pin fins 19 are arranged approximately in parallel to the base surface on which the substrate is mounted, in the same manner as the first embodiment.

As mentioned above, in accordance with the first and second embodiments, it is possible to achieve a high-performance heat sink 6 by utilizing the high heat conductivity around the pin fin, it is possible to achieve a cooling system of the LED with higher performance and more stably, it is possible to stably prevent a temperature increase of the LED, and it is possible to achieve a display system having a higher reliability.

As mentioned above, since the present invention can efficiently radiate the heat generated by the LED or the like, as the edge light backlight type display unit using the light generation source such as the LED or the like, it is possible to achieve the backlight apparatus having a high brightness and a high color reproduction performance, or the display unit using the same.

Further, since the backlight apparatus can be achieved by a reduced number of LEDs, it is possible to achieve the backlight apparatus having a low cost, or the display unit using the same. Further, since it is possible to uniformize the temperature difference between a plurality of LEDs, it is possible to reduce an irregularity of the LED light output, and it is possible to achieve the display unit having a reduced brightness irregularity of the screen of the display unit. Further, since it is possible to keep the temperature level of the LED low, it is possible to achieve the display unit having a high long-term reliability. Further, if the fan breaks down, the cooling performance can be secured by increasing the rotating speed of the remaining fan by monitoring the temperature of the LED. Accordingly, it is possible to provide the display unit having a high redundancy.

As mentioned above, in order to achieve the object mentioned above, the display unit in accordance with the present invention is structured as follows on the basis of the edge light type display unit provided with a plurality of light generating sources, a substrate on which the light generating sources are mounted, a lens directing light beams from the light generating sources in one direction, a diffusion plate expanding the light beams input from an incident surface in a side surface and outgoing from the lens to a surface shape so as to irradiate to a front surface, and a liquid crystal panel attached to a front surface of the diffusion plate.

1. The display unit is provided with a heat sink attached so as to be thermally contacted with an opposite side to the light generating source mounting surface of the substrate, and one or a plurality of fans, a base portion of the heat sink has a substrate mounting surface and a fin constituting surface, the fin constituting surface is approximately perpendicular to the substrate mounting surface, and the fin constituting surface of the base portion and an air supply and exhaust surface of a cooling air are formed in an opposite side to a screen display side of the display.
2. The display unit is provided with a heat sink attached so as to be thermally contacted with an opposite side to the light generating source mounting surface of the substrate, and one or a plurality of fans, a base portion of the heat sink has an approximately L-shaped form, a base surface on which the substrate is mounted, and a base surface in which the fin is constituted are approximately perpendicular to each other, and the base surface in which the fin of the base portion is constituted, and an air supply and exhaust surface of a cooling air are formed in an opposite side to a screen display side of the display.
3. The display unit is provided with a heat sink attached so as to be thermally contacted with an opposite side to the light generating source mounting surface of the substrate, and two fans attached to both end portions of the heat sink in such a manner that a cooling air circulates in an exhausting direction, and a wind leak preventing cover is provided in an end surface portion of the heat sink in such a manner that an inflow port of the cooling air to the heat sink is formed near a center portion of the heat sink.
4. The display unit is provided with a heat sink attached so as to be thermally contacted with an opposite side to the light generating source mounting surface of the substrate, and one or a plurality of fans attached to a portion near a center portion of the heat sink in such a manner that a cooling air circulates in a compressing direction, and a wind leak preventing cover is provided in an end surface portion of the heat sink in such a manner that a discharge port of the cooling air from the heat sink is formed near both end portions of the heat sink.
5. The display unit is provided with a heat sink attached so as to be thermally contacted with an opposite side to the light generating source mounting surface of the substrate, and one or a plurality of fans, a base portion of the heat sink has an approximately L-shaped form, a base surface on which the substrate is mounted, and a base surface in which the fin is constituted are approximately perpendicular to each other, the base surface in which the fin of the base portion is constituted, and an air supply and exhaust surface of a cooling air are formed in an opposite side to a screen display side of the display, and a plurality of fins constituted in the base portion are formed by plate fins arranged approximately in parallel to the base surface on which the substrate is mounted.
6. A base portion of the heat sink has an approximately L-shaped form, a base surface on which the substrate is mounted, and a base surface in which the fin is constituted are approximately perpendicular to each other, the base surface in which the fin of the base portion is constituted, and an air supply and exhaust surface of a cooling air are formed in an opposite side to a screen display side of the display, and a plurality of fins constituted in the base portion are formed by pin-type fins arranged approximately in parallel to the base surface on which the substrate is mounted.
7. The display unit is provided with a heat sink attached so as to be thermally contacted with an opposite side to the light generating source mounting surface of the substrate, and two rotating speed variable type fans attached to both end portions of the heat sink in such a manner that a cooling air circulates in an exhausting direction, a wind leak preventing cover is provided in an end surface portion of the heat sink in such a manner that an inflow port of the cooling air to the heat sink is formed near a center portion of the heat sink, a temperature sensor is provided in the light generating source or the substrate on which the light generating source is mounted, so as to be capable of monitoring a temperature thereof, and the rotating speed of the fan is controllable in such a manner that the temperature of the light generating source becomes proper at an abnormal time.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An edge light type display unit comprising:
a plurality of light generating sources;
a substrate on which said light generating sources are mounted;
a lens directing light beams from the light generating sources in one direction;
a diffusion plate expanding the light beams input from an incident surface in a side surface of said diffusion plate and outgoing from said lens to a surface shape so as to irradiate to a front surface of said diffusion plate; and
a liquid crystal panel attached to said front surface of said diffusion plate,
wherein the display unit is provided with a heat sink attached so as to be thermally contacted with an opposite side to a light generating source mounting surface of said substrate, and one or a plurality of fans, a base portion of said heat sink has a substrate mounting surface and a fin constituting surface, said fin constituting surface is substantially perpendicular to said substrate mounting surface, at least one fin mounted on said fin constituting surface so as to extend from said fin constituting surface in a direction substantially perpendicular thereto and to extend along said plurality of said light generating sources in a direction parallel to said substrate, and an air supply and exhaust surface of a cooling air are formed in a back surface side of the display unit so that the cooling air is sucked from the back surface side and is exhausted at the back surface side proximate to an end portion of the at least one fin.

2. An edge like display unit according to claim 1, wherein a respective fan of a plurality of fans is disposed at the back surface side proximate to both end portions of the at least one fin so that the cooling air enters proximate to a central portion of the at least one fin, branches in opposite directions, and is exhausted by the respective fans proximate to both of the end portions of the at least one fin.

3. An edge like display unit according to claim 2, wherein the plurality of light generating sources is a plurality of LEDs mounted on said substrate so as to be linearly arranged in a longitudinal direction of a base portion of said heat sink.

4. An edge light display unit comprising:
a plurality of light generating sources;
a substrate on which said light generating sources are mounted;
a lens directing light beams from the light generating sources in one direction;
a diffusion plate expanding the light beams input from an incident surface in a side surface of said diffusion plate and outgoing from said lens to a surface shape so as to irradiate to a front surface of said diffusion plate; and
a liquid crystal panel attached to said front surface of said diffusion plate,
wherein the display unit is provided with a heat sink attached so as to be thermally contacted with an opposite side to a light generating source mounting surface of said substrate, and one or a plurality of fans, a base portion of said heat sink has an approximately L-shaped form, a base surface on which the substrate is mounted and a base surface from which at least one fin extends are approximately perpendicular to each other, said at least one fin extending along said plurality of light generating sources in a direction parallel to said substrate, and an air supply and exhaust surface of a cooling air are formed in a back surface side of the display unit so that the cooling air is sucked from the back surface side and is exhausted at the back surface side proximate to an end portion of the at least one fin.

5. An edge like display unit according to claim 4, wherein a respective fan of a plurality of fans is disposed at the back surface side proximate to both end portions of the at least one fin so that the cooling air enters proximate to a central portion of the plurality of fins, branches in opposite directions, and is exhausted by the respective fans proximate to both of the end portions of the at least one fin.

6. An edge like display unit according to claim 5, wherein the plurality of light generating sources is a plurality of LEDs mounted on said substrate so as to be linearly arranged in a longitudinal direction of a base portion of said heat sink.

7. An edge light display unit comprising:
a plurality of light generating sources;
a substrate on which said light generating sources are mounted;
a lens directing light beams from the light generating sources in one direction
a diffusion plate expanding the light beams input from an incident surface in a side surface of said diffusion plate and outgoing from said lens to a surface shape so as to irradiate to a front surface of said diffusion plate; and
a liquid crystal panel attached to a front surface of said diffusion plate,
wherein the display unit is provided with a heat sink attached so as to be thermally contacted with an opposite side to the light generating source mounting surface of said substrate, and two fans attached to both end portions of said heat sink in such a manner that a cooling air circulates in an exhausting direction, and a wind leak preventing cover is provided in an end surface portion of said heat sink in such a manner that an inflow port of the cooling air to said heat sink is formed near a center portion of said heat sink.

8. An edge like display unit according to claim 7, wherein said plurality of light generating sources is a plurality of LEDs mounted on said substrate so as to be linearly arranged in a longitudinal direction of said heat sink so that the cooling air which enters the inflow port formed near the center portion of said heat sink, branches in opposite directions, and is exhausted by the two fans attached to both end portions of said heat sink.

9. An edge like display unit according to claim 8, wherein said heat sink has an approximately L-shaped form, having a first base surface on which said substrate is mounted and a second base surface perpendicular to said first base surface, and a plurality of fins extending from said second base surface along said plurality of LEDs in a direction parallel to said substrate, said two fans being arranged proximate to both end portions of said plurality of fins.

10. An edge light display unit comprising:
a plurality of light generating sources;
a substrate on which said light generating sources are mounted;
a lens directing light beams from the light generating sources in one direction;
a diffusion plate expanding the light beams input from an incident surface in a side surface of said diffusion plate and outgoing from said lens to a surface shape so as to irradiate to a front surface of said diffusion plate; and
a liquid crystal panel attached to a front surface of said diffusion plate,
wherein the display unit is provided with a heat sink attached so as to be thermally contacted with an opposite side to the light generating source mounting surface of said substrate, and one or a plurality of fans attached to a portion near a center portion of said heat sink in such a manner that a cooling air circulates in a compressing direction, and a wind leak preventing cover is provided in an end portion at a back surface side of said heat sink in such a manner that a discharge port of the cooling air from said heat sink is formed near both end portions of said back surface side of said heat sink.

11. An edge like display unit according to claim 10, wherein said plurality of light generating sources is a plurality of LEDs mounted on said substrate and linearly arranged so as to extend in a longitudinal direction of said heat sink so that the cooling air which enters the inflow port formed near the center portion of said heat sink, branches in opposite directions, and is exhausted by the two fans attached to both end portions of said heat sink, said heat sink has an approximately L-shaped form, having a first base surface on which said substrate is mounted and a second base surface perpendicular to said first base surface, and a plurality of fins extending from said second base surface along said plurality of LEDs in a direction parallel to said substrate, said two fans being arranged proximate to both end portions of said plurality of fins.

12. An edge light display unit comprising:
a plurality of light generating sources;
a substrate on which said light generating sources are mounted;
a lens directing light beams from the light generating sources in one direction;

a diffusion plate expanding the light beams input from an incident surface in a side surface of said diffusion plate and outgoing from said lens to a surface shape so as to irradiate to a front surface of said diffusion plate; and a liquid crystal panel attached to a front surface of said diffusion plate, wherein the display unit is provided with a heat sink attached so as to be thermally contacted with an opposite side to the light generating source mounting surface of said substrate, and one or a plurality of fans, a base portion of said heat sink has an approximately L-shaped form, a base surface on which the substrate is mounted, and a base surface in which the fin is constituted are approximately perpendicular to each other, the base surface in which the fin of the base portion is constituted, and an air supply and exhaust surface of a cooling air are formed in back surface side of the display unit, and a plurality of fins constituted in the base portion are formed by plate fins arranged approximately in parallel to the base surface on which the substrate is mounted, wherein the cooling air is sucked from the back surface side and is exhausted at the back surface side proximate to at least one end portion of the plurality of fins.

13. An edge like display unit according to claim 12, wherein a respective fan of a plurality of fans is disposed at the back surface side proximate to both end portions of the plurality of fins so that the cooling air enters proximate to a central portion of the plurality of fins, branches in opposite directions, and is exhausted by the respective fans proximate to both of the end portions of the plurality of fins.

14. An edge like display unit according to claim 13, wherein the plurality of light generating sources is a plurality of LEDs mounted on said substrate so as to be linearly arranged in a longitudinal direction of a base portion of said heat sink.

15. An edge light display unit comprising:
a plurality of light generating sources;
a substrate on which said light generating sources are mounted;
a lens directing light beams from the light generating sources in one direction;
a diffusion plate expanding the light beams input from an incident surface in a side surface of said diffusion plate and outgoing from said lens to a surface shape so as to irradiate to a front surface of said diffusion plate; and
a liquid crystal panel attached to a front surface of said diffusion plate,
wherein the display unit is provided with a heat sink attached so as to be thermally contacted with an opposite side to the light generating source mounting surface of said substrate, and one or a plurality of fans, a base portion of said heat sink has an approximately L-shaped form, a base surface on which the substrate is mounted, and a base surface in which the fin is constituted are approximately perpendicular to each other, the base surface in which the fin of the base portion is constituted, and an air supply and exhaust surface of a cooling air are formed in back surface side of the display unit, and a plurality of fins constituted in the base portion are formed by pin-type fins arranged approximately in parallel to the base surface on which the substrate is mounted, wherein the cooling air is sucked from the back surface side and is exhausted at the back surface side proximate to at least one end of said substrate in a region of the plurality of fins.

16. An edge like display unit according to claim 15, wherein a respective fan of a plurality of fans is disposed at the back surface side proximate to the end portions of the plurality of fans so that the cooling air enters proximate to a central portion of the plurality of fan, branches in opposite directions, and is exhausted by the respective fins proximate to both of the end portions of the plurality of fins.

17. An edge like display unit according to claim 16, wherein the plurality of light generating sources is a plurality of LEDs mounted on said substrate so as to be linearly arranged in a longitudinal direction of a base portion of said heat sink.

18. An edge light display unit comprising:
a plurality of light generating sources;
a substrate on which said light generating sources are mounted;
a lens directing light beams from the light generating sources in one direction;
a diffusion plate expanding the light beams input from an incident surface in a side surface of said diffusion plate and outgoing from said lens to a surface shape so as to irradiate to a front surface of said diffusion plate; and
a liquid crystal panel attached to a front surface of said diffusion plate;
wherein the display unit is provided with a heat sink attached so as to be thermally contacted with an opposite side to the light generating source mounting surface of said substrate, and two rotating speed variable type fans attached to both end portions of said heat sink in such a manner that a cooling air circulates in an exhausting direction, a wind leak preventing cover is provided in an end portion of a back surface side said heat sink in such a manner that an inflow port of the cooling air to said heat sink is formed near a center portion of said heat sink and the cooling air is exhausted proximate to both end portions of said back surface side said heat sink, a temperature sensor is provided in said light generating source or the substrate on which said light generating source is mounted, so as to be capable of monitoring a temperature thereof, and the rotating speed of the fan is controllable in such a manner that the temperature of said light generating source becomes proper at an abnormal time.

19. An edge like display unit according to claim 18, wherein a respective fan of the two fans is disposed at the back surface side proximate to an end portions of a plurality of fins of said heat sink so that the cooling air enters proximate to a central portion of the plurality of fins, branches in opposite directions, and is exhausted by the respective fans proximate to both of the end portions of the plurality of fins.

20. An edge like display unit according to claim 19, wherein the plurality of light generating sources is a plurality of LEDs mounted on said substrate so as to be linearly arranged in a longitudinal direction of a base portion of said heat sink.

* * * * *